US011835150B2

(12) United States Patent
Kim et al.

(10) Patent No.: US 11,835,150 B2
(45) Date of Patent: Dec. 5, 2023

(54) AIR CONTROL VALVE FOR FUEL CELL VEHICLE

(71) Applicants: HYUNDAI MOTOR COMPANY, Seoul (KR); KIA CORPORATION, Seoul (KR)

(72) Inventors: Sang Woo Kim, Chuncheon-si (KR); Ju Yong Lee, Suwon-si (KR); Byeong Seung Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 223 days.

(21) Appl. No.: 17/331,002

(22) Filed: May 26, 2021

(65) Prior Publication Data

US 2022/0128168 A1 Apr. 28, 2022

(30) Foreign Application Priority Data

Oct. 22, 2020 (KR) .......................... 10-2020-0137426

(51) Int. Cl.
*F16K 31/54* (2006.01)
*F16K 3/316* (2006.01)
*F16K 3/18* (2006.01)
*F16K 11/14* (2006.01)
*F16K 11/044* (2006.01)
*H01M 8/04089* (2016.01)

(52) U.S. Cl.
CPC ................ *F16K 31/54* (2013.01); *F16K 3/18* (2013.01); *F16K 3/316* (2013.01); *F16K 11/044* (2013.01); *F16K 11/14* (2013.01); *H01M 8/04089* (2013.01); *Y10T 137/8741* (2015.04); *Y10T 137/87161* (2015.04)

(58) Field of Classification Search
CPC . F16K 31/54; F16K 3/18; F16K 3/316; F16K 11/044; F16K 11/14; F16K 11/16; F16K 11/161; H01M 8/04089; Y10T 137/87981; Y10T 137/87748; Y10T 137/87732; Y10T 137/87708; Y10T 137/8741; Y10T 137/87161
USPC ....... 137/595, 601.01, 862, 865, 867, 614.11
See application file for complete search history.

(56) References Cited

U.S. PATENT DOCUMENTS 2,192,193 A * 3/1940 Johnson ............... G05D 23/125
137/630.19
2,240,163 A * 4/1941 Pick ........................ F16K 11/16
137/596.2

(Continued)

FOREIGN PATENT DOCUMENTS

| JP | 3435445 B2 | 8/2003 |
| KR | 10-1036238 B1 | 6/2011 |
| KR | 10-1245204 B1 | 3/2013 |

*Primary Examiner* — John Bastianelli
(74) *Attorney, Agent, or Firm* — LEMPIA SUMMERFIELD KATZ LLC

(57) ABSTRACT

An air control valve for a fuel cell vehicle includes: a valve housing formed with air flow paths; valve members configured to selectively open or close the air flow paths; and a drive unit configured to rectilinearly operate the valve members so that the valve members rectilinearly move from a first position at which the air flow paths are closed to a second position at which the air flow paths are opened, such that it is possible to obtain an advantageous effect of improving sealing performance and improving stability and reliability.

17 Claims, 11 Drawing Sheets

(56) References Cited

U.S. PATENT DOCUMENTS

| | | | | |
|---|---|---|---|---|
| 2,628,637 A | * | 2/1953 | Pedrick | F16K 31/524 |
| | | | | 137/630.2 |
| 2,714,394 A | * | 8/1955 | Moran | F16K 11/044 |
| | | | | 137/625.29 |
| 2,891,577 A | * | 6/1959 | Stewart, Jr. | B60G 17/0155 |
| | | | | 137/596.2 |
| 3,012,583 A | * | 12/1961 | Gorgens | F16K 1/44 |
| | | | | 137/625.34 |
| 3,063,734 A | * | 11/1962 | Raymond | B60G 17/0525 |
| | | | | 251/117 |
| 3,625,422 A | * | 12/1971 | Johnson | F16T 1/10 |
| | | | | 137/601.01 |
| 4,314,585 A | * | 2/1982 | Nishimiya | F16K 1/44 |
| | | | | 251/129.08 |
| 4,895,126 A | * | 1/1990 | Nishimiya | F16K 1/44 |
| | | | | 123/588 |
| 5,606,994 A | * | 3/1997 | Tanikawa | F16K 11/161 |
| | | | | 137/627.5 |
| 6,382,195 B1 | | 5/2002 | Green et al. | |
| 7,000,635 B2 | * | 2/2006 | Erbe | F16K 1/44 |
| | | | | 137/625.36 |
| 7,494,107 B2 | * | 2/2009 | Sheydayi | H01L 21/67126 |
| | | | | 414/935 |
| 9,157,538 B2 | * | 10/2015 | Bachmann | F16K 51/02 |
| 2017/0314691 A1 | * | 11/2017 | Aboujaib | F23K 5/147 |
| 2019/0234230 A1 | * | 8/2019 | Nishiyama | F01D 17/145 |

\* cited by examiner

AIR CONTROL VALVE FOR FUEL CELL VEHICLE

CROSS-REFERENCE TO RELATED APPLICATION

This application claims priority to and the benefit of Korean Patent Application No. 10-2020-0137426, filed on Oct. 22, 2020, the entire contents of which are incorporated herein by reference.

FIELD

The present disclosure relates to an air control valve for a fuel cell vehicle, which is capable of improving sealing performance and preventing a deterioration of a fuel cell stack.

BACKGROUND

The statements in this section merely provide background information related to the present disclosure and may not constitute prior art.

A fuel cell system refers to a system that continuously produces electrical energy by means of a chemical reaction of continuously supplied fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like. Among the fuel cells, the polymer electrolyte membrane fuel cell is applied to the field of a hydrogen vehicle (hydrogen fuel cell vehicle) being developed to substitute for an internal combustion engine.

The hydrogen vehicle includes a fuel cell stack that produces electricity through an oxidation-reduction reaction between hydrogen and oxygen $O_2$. The hydrogen vehicle is configured to travel as a motor is operated by electricity produced by the fuel cell stack.

Meanwhile, the hydrogen vehicle is provided with an air control valve configured to control air to be introduced into the fuel cell stack and to control air discharged from the fuel cell stack.

A valve member (valve disc) of the air control valve operates to open an air flow path while the vehicle operates, and the valve member operates to close the air flow path when the vehicle does not operate.

We have discovered that if air is introduced into the fuel cell stack while the vehicle is not used over a long period of time (e.g., the vehicle is parked over a long period of time), the fuel cell stack deteriorates, which causes a decrease in performance of the fuel cell stack.

SUMMARY

The present disclosure provides an air control valve for a fuel cell vehicle, which is capable of improving sealing performance and inhibiting a deterioration of a fuel cell stack.

The present disclosure has also been made in an effort to improve sealing performance in a state in which a valve member closes an air flow path.

The present disclosure has also been made in an effort to improve stability and reliability.

The present disclosure has also been made in an effort to simplify a structure and miniaturize a device.

The object to be achieved by the form is not limited to the above-mentioned objects, but also includes objects or effects that may be recognized from the solutions or the forms described below.

In one aspect of the present disclosure, an air control valve for a fuel cell vehicle includes: a valve housing formed with air flow paths; valve members configured to selectively open or close the air flow paths; and a drive unit configured to rectilinearly operate the valve members so that the valve members rectilinearly r cove from a first position at which the air flow paths are closed to a second position at which the air flow paths are opened. This is to improve sealing performance of the air control valve for a fuel cell vehicle and prevent a deterioration of the fuel cell stack.

That is, when air is introduced into the fuel cell stack due to a deterioration in sealing performance of the air control valve while the fuel cell vehicle is not used over a long period of time, there is a problem in that the fuel cell stack deteriorates, which causes a decrease in performance of the fuel cell stack.

In the related art, a valve member configured to open or close an air flow path provided in an air control valve opens or closes the air flow path while rotating about a rotation axis. As a result, there is a problem in that it is difficult to uniformly form overall pressing force to be applied to the valve member when the valve member closes the air flow path (surface pressure that brings the valve member into contact with a wall surface of the air flow path to close the air flow path). In particular, in the case of the structure in which the valve member rotates about the rotation axis, pressing force applied to a second portion of the valve member distant from the rotation axis (a portion which is farther from the rotation axis than is a first portion) is lower than pressing force applied to the first portion of the valve member adjacent to the rotation axis. As a result, there is a problem in that sealing performance of the valve member deteriorates.

In contrast, according to some forms of the present disclosure, the valve member opens or closes the air flow path while rectilinearly moving. As a result, it is possible to obtain an advantageous effect of uniformly forming and sufficiently providing, over the entire valve member, the pressing force to be applied to the valve member when the valve member closes the air flow path, improving the sealing performance of the valve member, and preventing the air from being introduced into the fuel cell stack when the fuel cell vehicle is not used.

According to one form of the present disclosure, the air flow paths may include a first flow path, and a second flow path separated from the first flow path, and the valve members may include a first valve disc configured to selectively open or close the first flow path by being rectilinearly moved by the drive unit, and a second valve disc configured to selectively open or close the second flow path by being rectilinearly moved by the drive unit, According to another form of the present disclosure, a bypass flow path configured to connect the first flow path and the second flow path and allow air introduced into the first flow path to selectively flow to the second flow path may be provided in the valve housing.

The drive unit may have various structures capable of rectilinearly moving the valve member from the first position to the second position.

For example, the drive unit may include: a driving source configured to provide driving power; and a power converting part connected to the valve member and configured to convert the driving power of the driving source into the rectilinear motion of the valve member.

The power converting part may have various structures capable of converting the driving power of the driving source into the rectilinear motion of the valve member.

For example, the power converting part may include: a first gear configured to be rotated by the driving source; and a second gear connected to the valve member so as to engage with the first gear and configured to move the valve member by being rectilinearly moved by the rotation of the first gear.

According to one form of the present disclosure, the air control valve for a fuel cell vehicle may include a driving gear configured to be rotated by the driving source, and the power converting part may operate in conjunction with the driving gear.

According to another form of the present disclosure, the power converting part may be provided in the bypass flow path.

As described above, in the exemplary forms of the present disclosure, since the power converting part is disposed in the bypass flow path already provided to allow the air to selectively flow, it is not necessary to additionally provide a space for disposing the power converting part, and as a result, it is possible to obtain an advantageous effect of simplifying the structure and contributing to miniaturization of the device.

According to another form of the present disclosure, the air control valve for a fuel cell vehicle may include a support member provided in the valve housing and configured to support the rectilinear movement of the second gear relative to the valve housing.

As described above, in the exemplary forms of the present disclosure, since the rectilinear movement of the second gear is supported by the support member, it is possible to obtain an advantageous effect of minimizing vibration and withdrawal of the second gear and more stably providing the rectilinear movement of the second gear during the rectilinear movement of the second gear.

According to another form of the present disclosure, the air control valve for a fuel cell vehicle may include a first seating part provided in the valve housing to allow the valve member to be seated on the first seating part at the first position; and a second seating part provided in the valve housing to allow the valve member to be seated on the second seating part at the second position.

According to one form of the present disclosure, the air control valve for a fuel cell vehicle may include: a first sealing part provided on one surface of the valve member and configured to seal a gap between the valve member and the first seating part; a second sealing part provided on the other surface of the valve member and configured to seal a gap between the valve member and the second seating part; and a common sealing part provided on a lateral portion of the valve member and configured to seal a gap between the valve member and any one of the first and second seating parts in accordance with the movement of the valve member.

In particular, the common sealing part may be formed along an entire periphery of the valve member.

As described above, according to the forms of the present disclosure, in the state in which the valve member is seated on the first seating part, the gap between the valve member and the first seating part may be sealed by the dual sealing structure made by the first sealing part and the common sealing part, and as a result, it is possible to obtain an advantageous effect of improving sealing performance of the valve member and minimizing a leakage of air through the gap between the valve member and the first seating part.

Likewise, according to the form of the present disclosure, in the state in which the valve member is seated on the second seating part, the gap between the valve member and the second seating part is sealed by the dual sealing structure made by the second sealing part and the common sealing part, and as a result, it is possible to obtain an advantageous effect of improving sealing performance of the valve member and minimizing a leakage of air through the gap between the valve member and the second seating part.

According to one form of the present disclosure, the air control valve for a fuel cell vehicle may include a first guide sealing part provided on the first seating part and configured to seal the gap between the valve member and the first seating part in cooperation with the common sealing part, and a second guide sealing part provided on the second seating part and configured to seal the gap between the valve member and the second seating part in cooperation with the common sealing part.

According to one form of the present disclosure, the common sealing part may include a plurality of common sealing protrusions protruding from the lateral portion of the valve member, the first guide sealing part may include a plurality of first guide sealing protrusions formed on an inner surface of the first seating part that faces the lateral portion of the valve member, and the second guide sealing part may include a plurality of second guide sealing protrusions formed on an inner surface of the second seating part that faces the lateral portion of the valve member.

As described above, according to one form of the present disclosure, in the state in which the valve member is seated on the first seating part, the gap between the valve member and the first seating part may be sealed by the triple sealing structure made by the first sealing part, the common sealing part, and the first guide sealing part, and as a result, it is possible to obtain an advantageous effect of further improving the sealing performance of the valve member and more effectively preventing a leakage of air through the gap between the valve member and the first seating part.

As described above, according to one form of the present disclosure, in the state in which the valve member is seated on the second seating part, the gap between the valve member and the second seating part may be sealed by the triple sealing structure made by the second sealing part, the common sealing part, and the second guide sealing part, and as a result, it is possible to obtain an advantageous effect of further improving the sealing performance of the valve member and more effectively preventing a leakage of air through the gap between the valve member and the second seating part.

The arrangement structure between the common sealing protrusion and the first guide sealing protrusion (or the second guide sealing protrusion) may be variously changed depending on required conditions and design specifications.

According to one form of the present disclosure, the common sealing protrusions and the first guide sealing protrusions may come into close contact with one another so as to be alternately disposed in a movement direction of the valve member in the state in which the valve member is moved to the first position, and the common sealing protrusions and the second guide sealing protrusions may be alternately disposed in the movement direction of the valve member in the state in which the valve member is moved to the second position.

In particular, a first receiving portion corresponding to the common sealing protrusions may be defined between the adjacent first guide sealing protrusions, a second receiving portion corresponding to the common sealing protrusions may be defined between the adjacent second guide sealing protrusions, the common sealing protrusions may be received in the first receiving portion at the first position, and the common sealing protrusions may be received in the second receiving portion at the second position.

As described above, according to another form of the present disclosure, the common sealing protrusions and the first guide sealing protrusions (or the second guide sealing protrusions) are alternately in close contact with one another, and as a result, it is possible to obtain an advantageous effect of further improving the sealing performance of the common sealing part and the first guide sealing part (or the second guide sealing part).

According to an exemplary form of the present disclosure, the power converting part may include: a rotating shaft configured to be rotated by the driving source; and a reciprocating member connected to the valve member and configured to move the valve member by being rectilinearly reciprocated by the rotation of the rotating shaft.

According to another form of the present disclosure, the air control valve for a fuel cell vehicle may include guide members provided in the valve housing and configured to guide the rectilinear movements of the valve members relative to the valve housing.

For example, the valve member may be received in the guide member so as to be rectilinearly movable, a first close contact portion may be provided at one end of the guide member and configured to come into close contact with one surface of the valve member at the first position, and a second close contact portion may be provided at the other end of the guide member and configured to come into close contact with the other surface of the valve member at the second position.

As described above, in the exemplary form of the present disclosure, since the valve member rectilinearly moves along the inside of the guide member, it is possible to obtain an advantageous effect of minimizing vibration and withdrawal of the valve member and more stably providing the rectilinear movement of the valve member while the valve member rectilinearly moves.

According to one form of the present disclosure, the air control valve for a vehicle may include a stopper configured to selectively restrict a rotation section of the driving gear.

The stopper may have various structures capable of selectively restricting the rotation section of the driving gear. For example, the stopper may include: a first stopper protrusion provided in the valve housing; a first stopper part provided on the driving gear and configured to come into contact with the first stopper protrusion when the driving gear rotates by a preset first rotation section in a first direction; a second stopper protrusion provided in the valve housing so as to be spaced apart from the first stopper protrusion in a circumferential direction of the driving gear; and a second stopper part provided on the driving gear and configured to come into contact with the second stopper protrusion when the driving gear rotates by a preset second rotation section in a second direction.

As described above, according to one form of the present disclosure, when the driving gear rotates by the preset first rotation section in the first direction, the first stopper part comes into contact with the first stopper protrusion and restricts the rotation of the driving gear, such that an excessive rotation of the driving gear in the first direction may be prevented. As a result, it is possible to obtain an advantageous effect of preventing an excessive movement of the valve member.

Likewise, when the driving gear rotates by the preset second rotation section in the second direction, the second stopper part comes into contact with the second stopper protrusion and restricts the rotation of the driving gear, such that an excessive rotation of the driving gear in the second direction may be prevented. As a result, it is possible to obtain an advantageous effect of preventing an excessive movement of the valve member.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
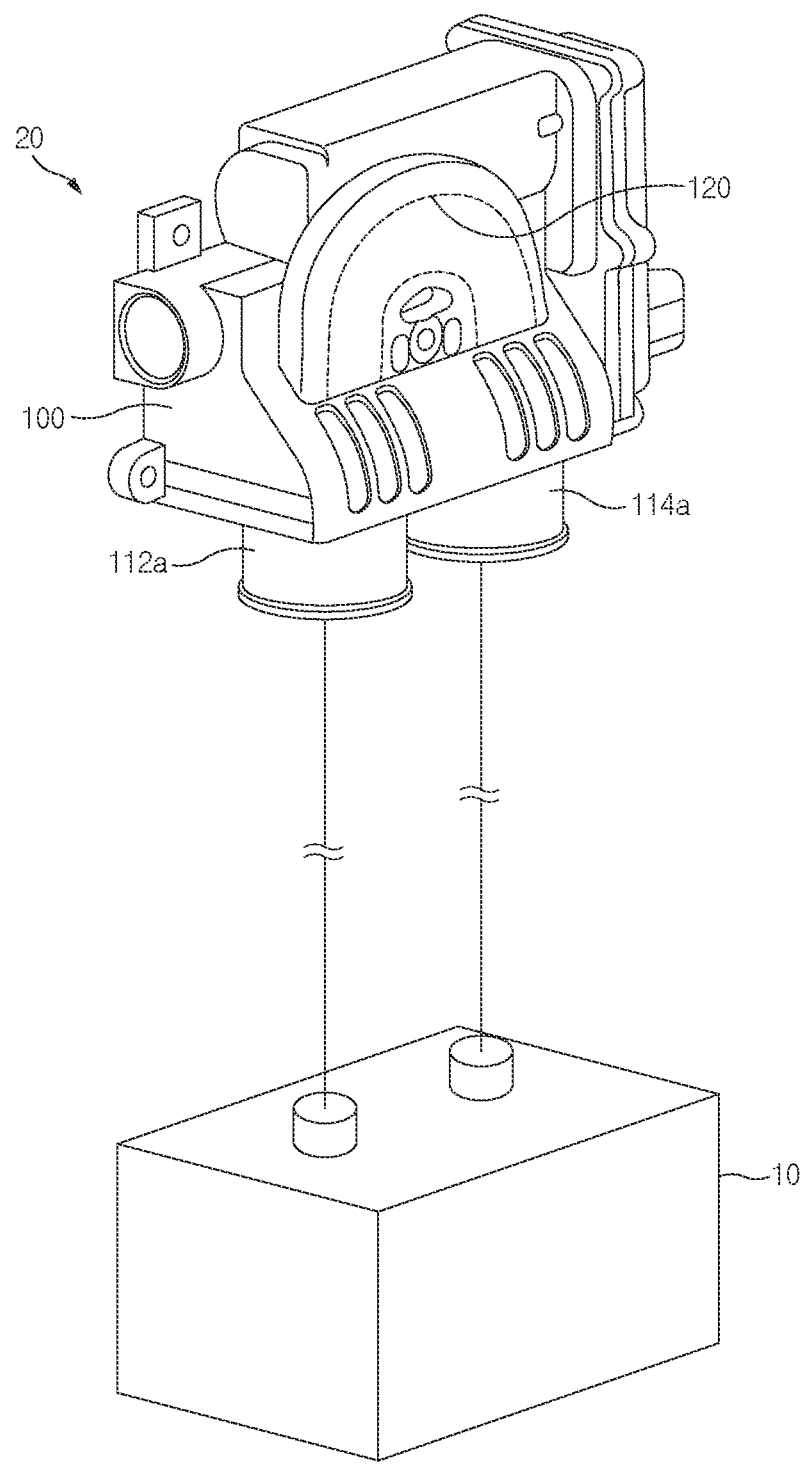
FIG. 1 is a view for explaining an air control valve for a fuel cell vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings.

However, the technical spirit of the present disclosure is not limited to the exemplary forms described herein but may be implemented in various different forms. One or more of the constituent elements in the forms may be selectively combined and substituted within the scope of the technical spirit of the present disclosure.

In addition, unless otherwise specifically and explicitly defined and stated, the terms (including technical and scientific terms) used in the forms of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the form of the present disclosure are for explaining the forms, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the forms of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Referring to FIGS. 1 to 11, an air control valve 20 for a fuel cell vehicle according to one form of the present disclosure includes: a valve housing 100 formed with air flow paths 110, valve members 200 configured to selectively open or close the air flow paths 110, and a drive unit 300 configured to rectilinearly operate the valve members 200 so that the valve members 200 rectilinearly move from a first position at which the valve members 200 close the air flow paths 110 to a second position at which the valve members 200 open the air flow paths 110.

For reference, the air control valve 20 according to the present disclosure may be used to control air to be introduced into a fuel cell stack 10 of a fuel cell vehicle and to control air discharged from the fuel cell stack 10.

The valve housing 100 is formed to have therein the air flow paths 110 through which air flows. The valve housing 100 is mounted in the vehicle (fuel cell vehicle).

The valve housing 100 may be variously changed in shape and structure accordance with required conditions and design specifications, but the present disclosure is not restricted or limited by the shape and the structure of the valve housing 100.

More specifically, the air flow paths 110 include a first flow path 112 through which the air is supplied to the fuel cell stack 10, and a second flow path 114 through which the air is discharged from the fuel cell stack 10. For example, in the valve housing 100, the first flow path 112 and the second flow path 114 may be individually separated (partitioned) by a partition wall (not illustrated).

In addition, the valve housing 100 is provided with a first port 112a connected to an air inlet port of the fuel cell stack 10, and a second port 114a connected to an air discharge port of the fuel cell stack 10.

For example, the first port 112a may communicate with the first flow path 112, and the air to be supplied to the fuel cell stack 10 may flow through the first port 112a. In addition, the second port 114a may communicate with the second flow path 114, and the air discharged from the fuel cell stack 10 may flow through the second port 114a.

In addition, the valve housing 100 is provided with a bypass flow path 120 configured to connect the first flow path 112 and the second flow path 114 and allow the air introduced into the first flow path 112 to selectively flow to the second flow path 114.

The valve members 200 are provided to selectively open or close the air flow paths 110 by being rectilinearly moved by the drive unit 300.

Figure 2:
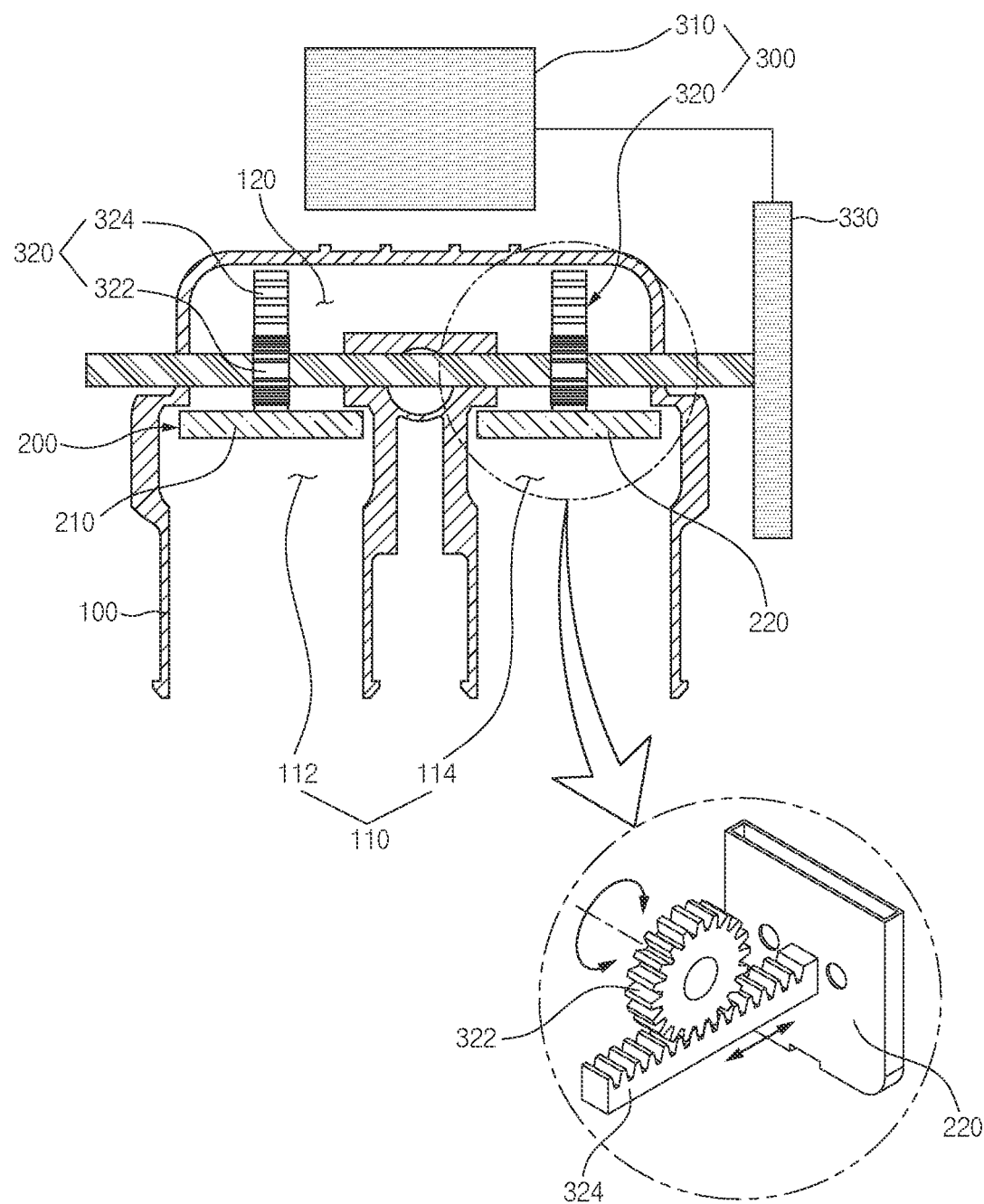
FIG. 2 is a view for explaining a drive unit of the air control valve for a fuel cell vehicle according to one form of the present disclosure.
Figure 3:
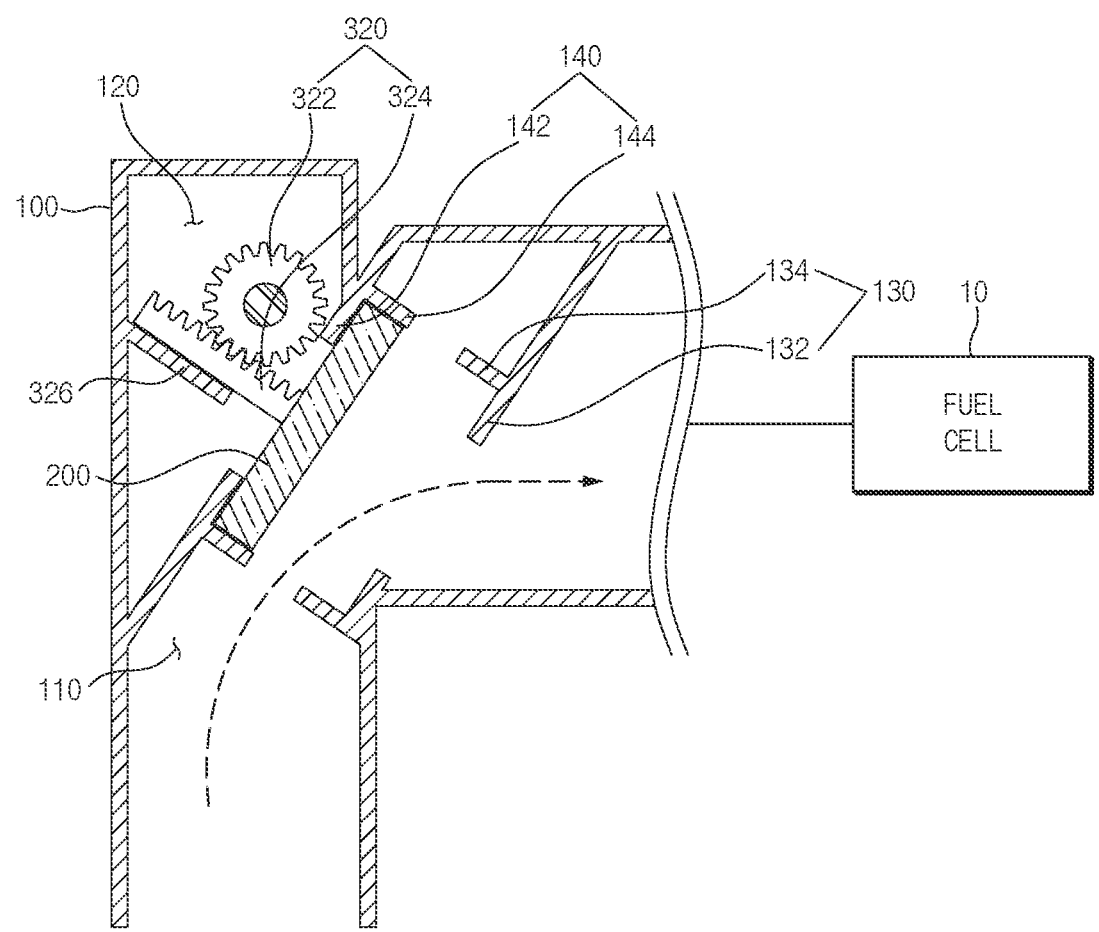
FIGS. 3 and 4 are views for explaining an operational structure of a valve member of the air control valve for a fuel cell vehicle according to some forms of the present disclosure.
Figure 4:
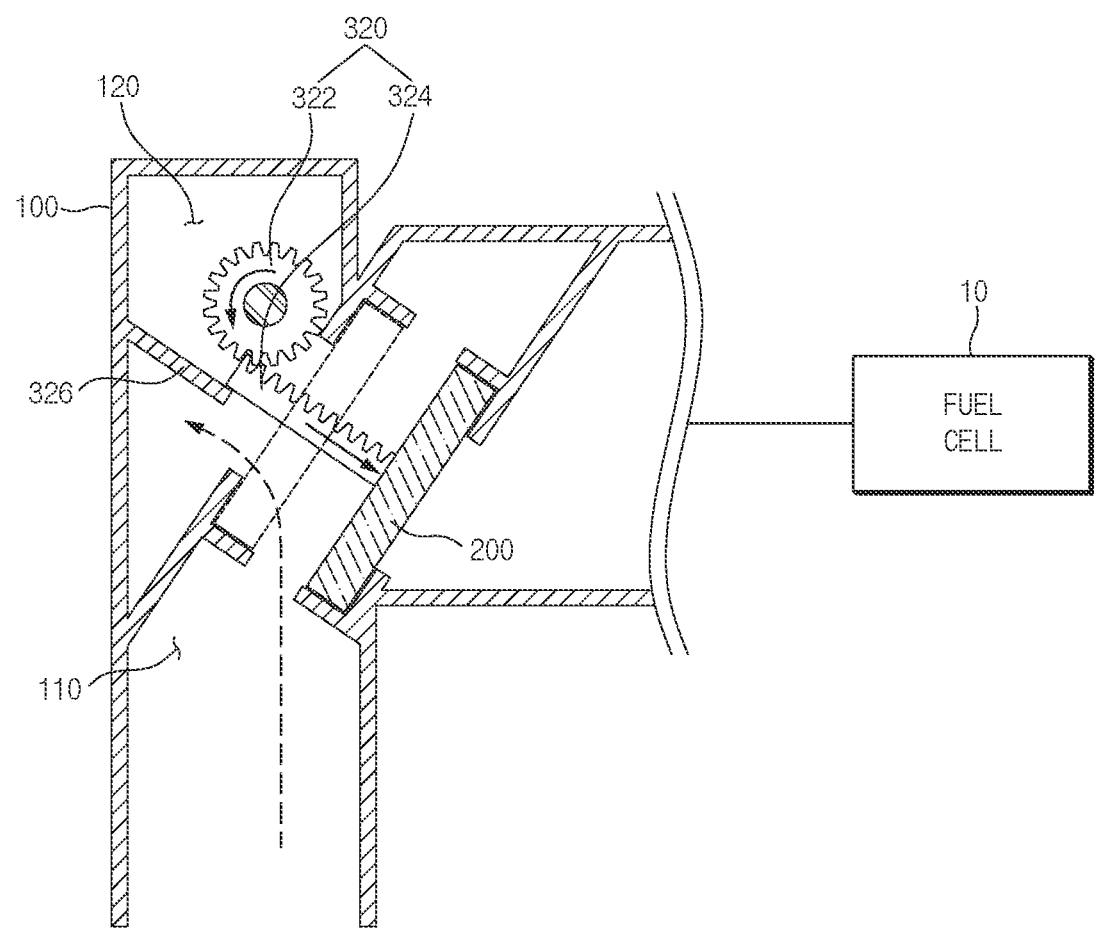

Referring to FIGS. 2 to 4, according to one form of the present disclosure, the valve members 200 include a first valve disc 210 configured to selectively open or close the first flow path 112, and a second valve disc 220 provided to be spaced apart from the first valve disc 210 and configured to selectively open or close the second flow path 114.

The first valve disc 210 and the second valve disc 220 may have various structures capable of opening and closing the first flow path 112 and the second flow path 114, and the present disclosure is not restricted or limited by the structures of the first valve disc 210 and the second valve disc 220.

The first valve disc 210 is provided to open or close the first flow path 112 by being rectilinearly moved by the drive unit 300.

For example, the first valve disc 210 may be formed to have a shape corresponding to a cross-sectional shape (e.g., a quadrangular cross-sectional shape) of the first flow path 112. According to another form of the present disclosure, the first valve disc may be formed in a shape different from the cross-sectional shape of the first flow path, and the present disclosure is not restricted or limited by the shape and the structure of the first valve disc.

The second valve disc 220 is provided to open or close the second flow path 114 by being rectilinearly moved by the drive unit 300.

For example, the second valve disc 220 is formed to have a shape corresponding to a cross-sectional shape (e.g., a quadrangular cross-sectional shape) of the second flow path 114. According to another form of the present disclosure, the second valve disc may be formed in a shape different from the cross-sectional shape of the second flow path, and the present disclosure is not restricted or limited by the shape and the structure of the second valve disc.

The drive unit 300 is provided to rectilinearly operate the valve members 200 so that the valve members 200 may rectilinearly move from the first position at which the valve members 200 close the air flow paths 110 to the second position at which the valve members 200 open the air flow paths 110.

That is, the first valve disc 210 may be rectilinearly moved by the drive unit 300 from the first position at which the first flow path 112 is closed to the second position at which the first flow path 112 is opened. The second valve disc 220 may be moved (rotated) by the drive unit 300 from the first position at which the second flow path 114 is closed to the second position at which the second flow path 114 is opened.

The drive unit 300 may have various structures capable of rectilinearly moving the valve members 200 from the first position to the second position, and the present disclosure is not restricted or limited by the structure of the drive unit 300.

For example, the drive unit 300 may include a driving source 310 configured to provide driving power, and power converting parts 320 connected to the valve members 200 and configured to convert the driving power of the driving source 310 into the rectilinear motion of the valve members 200.

Various drive means capable of providing the driving power may be used as the driving source 310, and the present disclosure is not restricted or limited by the type and the structure of the driving source 310. For example, a motor may be used as the driving source 310. According to another form of the present disclosure, a hydraulic (or pneumatic) cylinder, a solenoid, or the like may be used as the driving source.

The power converting part 320 is provided to convert the driving power of the driving source 310 into the rectilinear motion of the valve member 200.

The power converting part 320 may have various structures capable of converting the driving power of the driving source 310 into the rectilinear motion of the valve member 200, and the present disclosure is not restricted or limited by the structure of the power converting part 320.

For example, the power converting part 320 may include a first gear 322 provided to be rotated by the driving source 310, and a second gear 324 connected to the valve member 200 so as to be able to engage with the first gear 322 and configured to move the valve member 200 by being rectilinearly moved by a rotation of the first gear 322.

For example, a typical pinion gear may be used as the first gear 322, and a typical rack gear may be used as the second gear 324.

In particular, the second gear 324 may be connected to a central portion of a rear surface (a surface facing the bypass flow path) of the valve member 200. As described above, since the second gear 324 is connected to the central portion of the valve member 200, it is possible to obtain an advantageous effect of uniformly forming pressing force to be applied to the valve member 200.

As the first gear 322 is rotated by the driving source 310, the second gear 324 engaging with the first gear 322 may rectilinearly move (rectilinearly move in an upward/downward direction based on FIG. 2), and the valve member 200 connected to the second gear 324 rectilinearly moves together with the second gear 324, such that the air flow path 110 may be opened or closed.

The connection structure between the driving source 310 and the power converting part 320 may be variously changed depending on required conditions and design specifications.

For example, the air control valve 20 for a fuel cell vehicle may include a driving gear 330 configured to be rotated by the driving source 310, and the power converting parts 320 may operate in conjunction with the driving gear 330.

More specifically, the first gear 322 may engage with the driving gear 330, and the first gear 322 may be rotated by a rotation of the driving gear 330, such that the second gear 324 may operate (rectilinearly move) in conjunction with the first gear 322.

According to another form of the present disclosure, the first gear may be configured to be rotated directly by the driving source.

According to the form of the present disclosure, the power converting parts 320 may be provided in the bypass flow path 120.

As described above, in the form of the present disclosure, since the power converting parts 320 are disposed in the bypass flow path 120 already provided to allow the air to selectively flow, it is not necessary to additionally provide a space for disposing the power converting parts 320, and as a result, it is possible to obtain an advantageous effect of simplifying the structure and contributing to miniaturization of the device.

For reference, it is possible to stably provide the flow of the air through the bypass flow path 120 even though the power converting parts 320 are provided in the bypass flow path 120.

Referring to FIG. 3, according to one form of the present disclosure, the air control valve 20 for a fuel cell vehicle may include a support member 326 provided in the valve housing 100 and configured to support the rectilinear movement of the second gear 324 relative to the valve housing 100.

The support member 326 may have various structures capable of supporting the rectilinear movement of the second gear 324 relative to the valve housing 100, and the present disclosure is not restricted or limited by the structure of the support member 326.

For example, one surface of the second gear 324 may be slidably supported by (in contact with) the support member 326.

As described above, in the form of the present disclosure, since the rectilinear movement of the second gear 324 is supported by the support member 326, it is possible to obtain an advantageous effect of minimizing or reducing vibration and withdrawal of the second gear 324 and more stably providing the rectilinear movement of the second gear 324 during the rectilinear movement of the second gear 324.

According to one form of the present disclosure, the air control valve 20 for a fuel cell vehicle may include a first seating part 130 provided in the valve housing 100 to allow the valve member 200 to be seated on the first seating part 130 at the first position (closed position), and a second seating part 140 provided in the valve housing 100 to allow the valve member 200 to be seated on the second seating part 140 at the second position (opened position).

The first seating part 130 and the second seating part 140 may have various structures on which the valve member 200 may be seated, and the present disclosure is not restricted or limited by the structures and the shapes of the first seating part 130 and the second seating part 140.

For example, the first seating part 130 may include a first bottom portion having a ring shape corresponding to an edge of one surface of the valve member 200, and a first wall portion formed along an edge of the first bottom portion so as to surround a lateral surface of the valve member 200. The valve member 200 may come into close contact with the first bottom portion at the first position, thereby closing the air flow path 110.

In addition, the second seating part 140 may include a second bottom portion having a ring shape corresponding to an edge of the other surface of the valve member 200, and a second wall portion formed along an edge of the second bottom portion so as to surround the lateral surface of the valve member 200. The valve member 200 may come into close contact with the second bottom portion at the second position, thereby opening the air flow path 110 and closing the bypass flow path 120.

Figure 5:
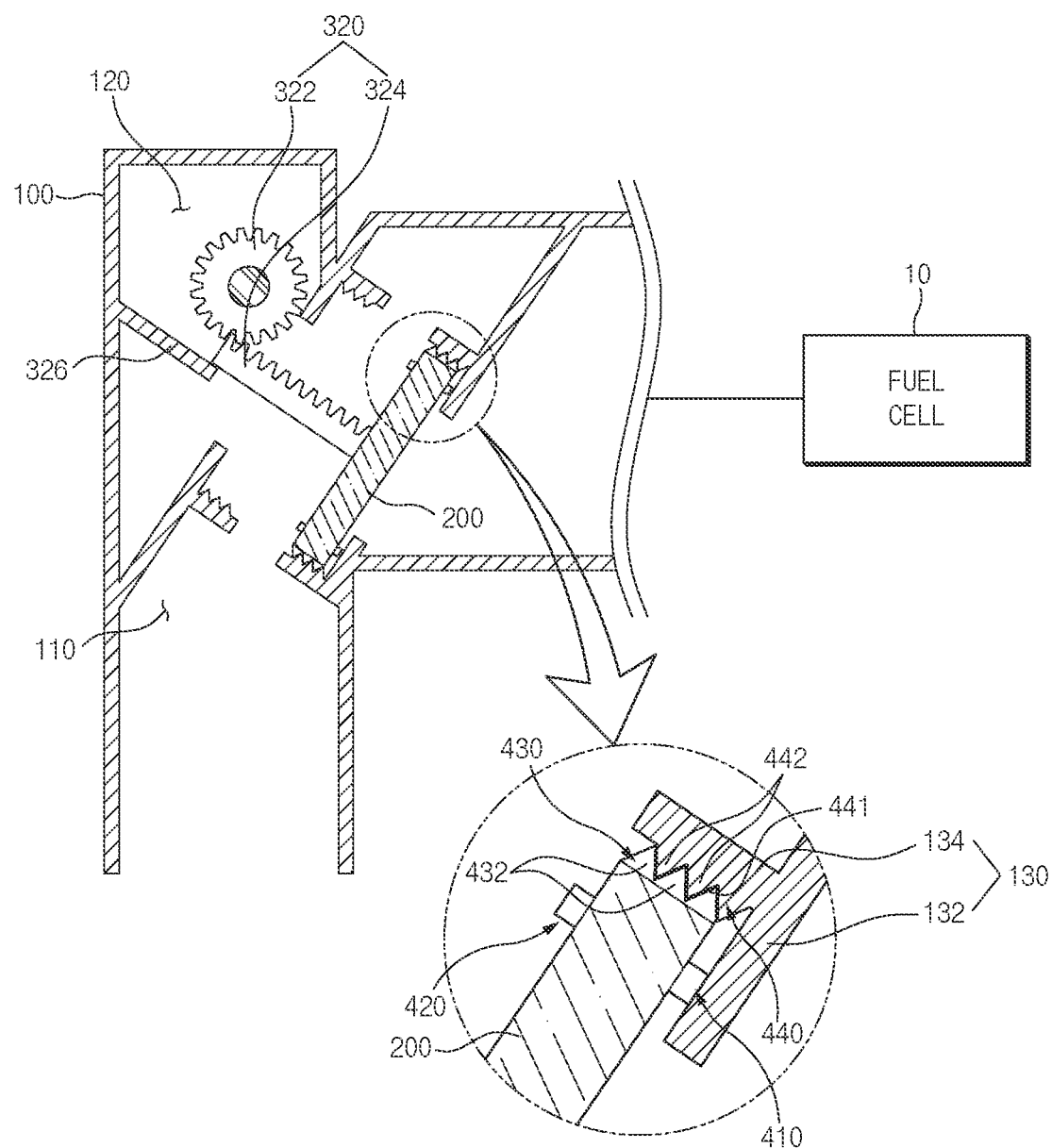
FIGS. 5 to 7 are views for explaining a common sealing part of the air control valve for a fuel cell vehicle according to some forms of the present disclosure.
Figure 6:
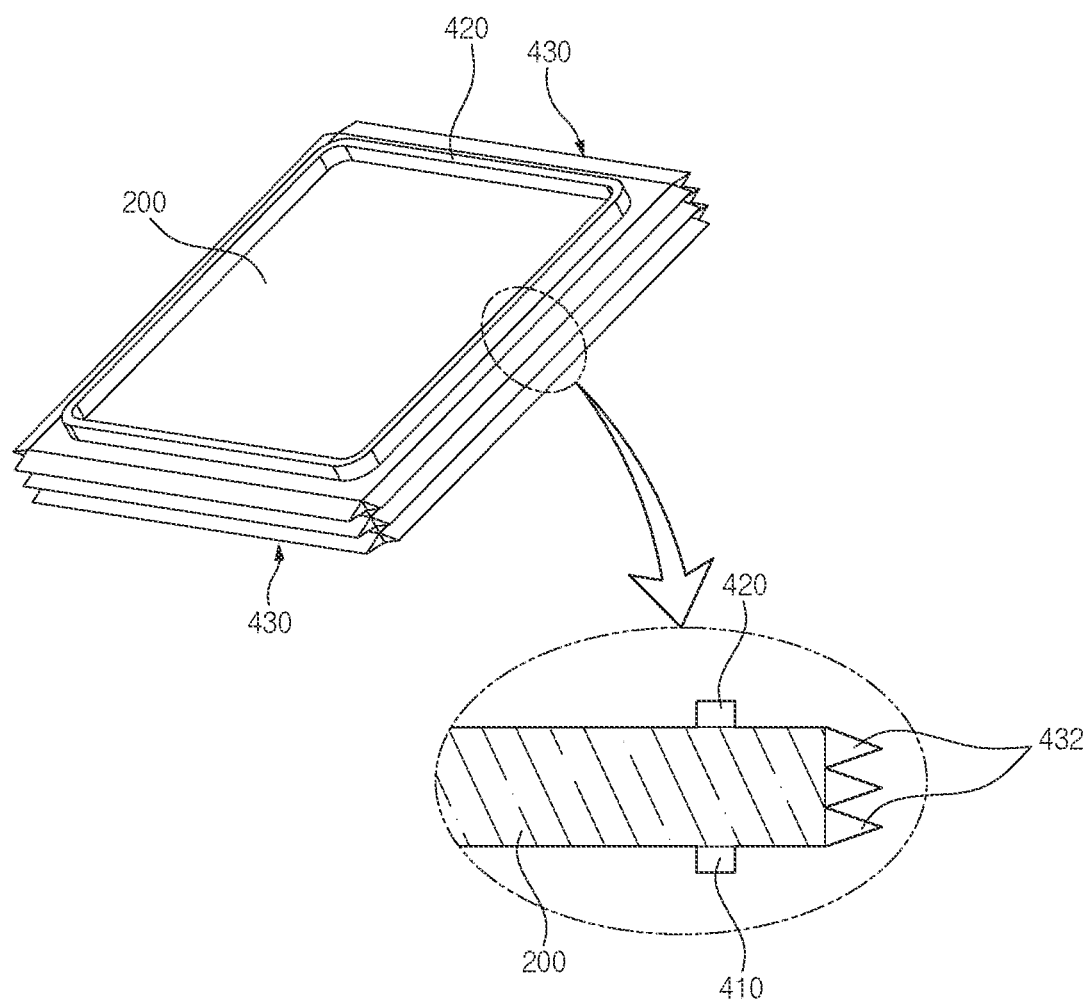
Figure 7:
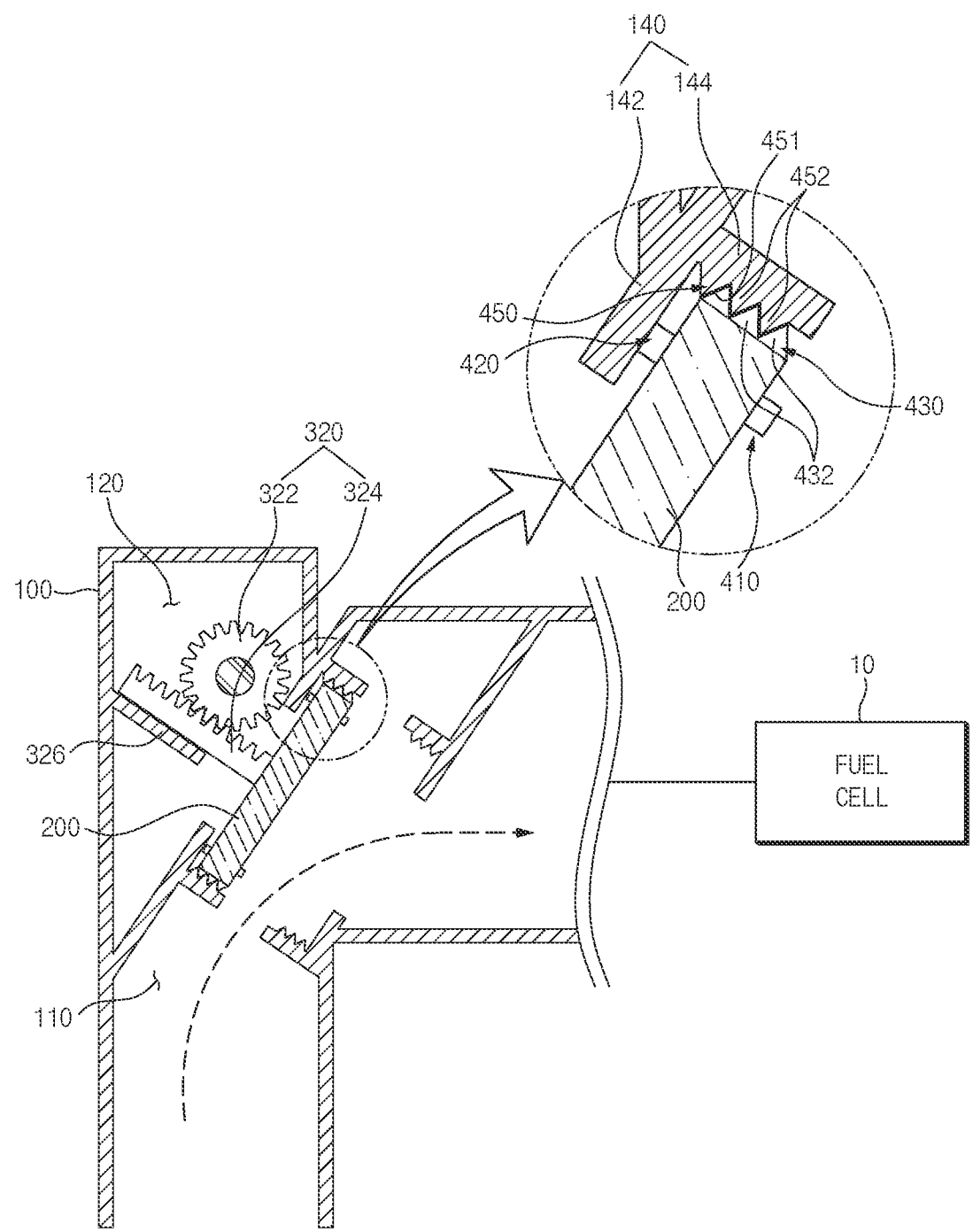

Referring to FIGS. 5 to 7, according to another form of the present disclosure, the air control valve 20 for a fuel cell vehicle may include a first sealing part 410 provided on one surface of the valve member 200 and configured to seal a gap between the valve member 200 and the first seating part 130, a second sealing part 420 provided on the other surface of the valve member 200 and configured to seal a gap between the valve member 200 and the second seating part 140, and a common sealing part 430 provided at a lateral portion of the valve member 200 and configured to seal a gap between the valve member 200 and any one of the first and second seating parts 130 and 140 in accordance with the movement of the valve member 200.

The first sealing part 410 may have various structures capable of sealing the gap between one surface of the valve member 200 and the first seating part 130 (the first bottom portion), and the present disclosure is not restricted or limited by the structure and the material of the first sealing part 410.

For example, the first sealing part 410 may be formed in the form of a quadrangular ring made of an elastic material such as rubber, silicone, or urethane and may be provided on one surface of the valve member 200 that faces the first bottom portion.

Hereinafter, an example in which the first sealing part 410 is formed to have a quadrangular cross-sectional shape will be described. According to another form of the present disclosure, the first sealing part may be configured to have a circular cross-sectional shape, a triangular cross-sectional shape, or other cross-sectional shapes.

The gap between the valve member 200 and the first bottom portion may be sealed by the first sealing part 410 in a state in which one surface of the valve member 200 is seated on the first seating part 130 (in a state in which the valve member 200 is moved to the first position).

The second sealing part 420 may have various structures capable of sealing the gap between the other surface of the valve member 200 and the second seating part 140 (the second bottom portion), and the present disclosure is not restricted or limited by the structure and the material of the second sealing part 420.

For example, the second sealing part 420 may be formed in the form of a quadrangular ring made of an elastic material such as rubber, silicone, or urethane and may be provided on the other surface of the valve member 200 that faces the second bottom portion.

Hereinafter, an example in which the second sealing part 420 is formed to have a quadrangular cross-sectional shape will be described. According to another form of the present disclosure, the second sealing part may be configured to have a circular cross-sectional shape, a triangular cross-sectional shape, or other cross-sectional shapes.

The gap between the valve member 200 and the second bottom portion may be sealed by the second sealing part 420 in a state in which the other surface of the valve member 200 is seated on the second seating part 140 (in a state in which the valve member 200 is moved to the second position).

The common sealing part 430 is provided on the lateral portion of the valve member 200 and configured to seal the gap between the valve member 200 and any one of the first and second seating parts 130 and 140 in accordance with the movement of the valve member 200.

In this case, the configuration in which the common sealing part 430 seals the gap between the valve member 200 and any one of the first and second seating parts 130 and 140 in accordance with the movement of the valve member 200 means that the common sealing part 430 seals the gap between the valve member 200 and the first seating part 130 in the state in which the valve member 200 is moved to the first position, and the common sealing part 430 seals the gap between the valve member 200 and the second seating part 140 in the state in which the valve member 200 is moved to the second position.

In particular, the common sealing part 430 may be formed (continuously) along an entire periphery of the valve member 200. According to another form of the present disclosure, the common sealing part may be partially formed on a part of the periphery of the valve member.

The common sealing part 430 may have various structures capable of sealing the gap between the lateral portion of the valve member 200 and the first seating part 130 (or the second seating part and the present disclosure is not restricted or limited by the structure of the common sealing part 430.

For example, the common sealing part 430 may include a plurality of common sealing protrusions 432 that may conic into elastic contact with the first wall portion or the second wall portion that faces the lateral portion of the valve member 200.

The common sealing protrusion 432 may be configured as an elastic body made of a material such as rubber, silicone, or urethane and capable of being elastically compressed, and the material and the physical property of the common sealing protrusion 432 may be variously changed depending on required conditions and design specifications.

According to one form of the present disclosure, each of the plurality of common sealing protrusions 432 may protrude from the lateral portion of the valve member 200 so as to have a triangular cross-sectional shape.

According to another form of the present disclosure, the common sealing protrusion may be formed to have a semicircular cross-sectional shape or other cross-sectional shapes. Alternatively, the common sealing part may have a single common sealing protrusion.

In the state in which the valve member 200 is moved to the first position, the common sealing protrusion 432 may be in elastic contact with the first wall portion, thereby sealing the gap between the valve member 200 and the first wall portion. In contrast, in the state in which the valve member 200 is moved to the second position, the common sealing protrusion 432 may be in elastic contact with the second wall portion, thereby sealing the gap between the valve member 200 and the second wall portion.

As described above, in the state in which the valve member 200 is seated on the first seating part 130, the gap between the valve member 200 and the first seating part 130 may be sealed by the dual sealing structure made by the first sealing part 410 and the common sealing part 430, and as a result, it is possible to obtain an advantageous effect of improving sealing performance of the valve member 200 and minimizing or reducing a leakage of air through the gap between the valve member 200 and the first seating part 130.

In another form of the present disclosure, in the state in which the valve member 200 is seated on the second seating part 140, the gap between the valve member 200 and the second seating part 140 is sealed by the dual sealing structure made by the second sealing part 420 and the common sealing part 430, and as a result, it is possible to obtain an advantageous effect of improving sealing performance of the valve member 200 and minimizing a leakage of air through the gap between the valve member 200 and the second seating part 140.

According to one form of the present disclosure, the air control valve 20 for a fuel cell vehicle may include a first guide sealing part 440 provided on the first seating part 130 and configured to seal the gap between the valve member 200 and the first seating part 130 in cooperation with the common sealing part 430, and a second guide sealing part 450 provided on the second seating part 140 and configured to seal the gap between the valve member 200 and the second seating part 140 in cooperation with the common sealing part 430.

The first guide sealing part 440 may have various structures capable of sealing the gap between the lateral portion of the valve member 200 and the first seating part 130, and the present disclosure is not restricted or limited by the structure of the first guide sealing part 440.

For example, the first guide sealing part 440 may include a plurality of first guide sealing protrusions 442 that may come into elastic contact with the lateral portion of the valve member 200.

The first guide sealing protrusion 442 may be configured as an elastic body made of a material such as rubber, silicone, or urethane and capable of being elastically compressed, and the material and the physical property of the first guide sealing protrusion 442 may be variously changed depending on required conditions and design specifications.

According to one form of the present disclosure, each of the plurality of first guide sealing protrusions 442 may protrude from an inner surface of the first wall portion so as to have a triangular cross-sectional shape.

According to another form of the present disclosure, the first guide sealing protrusion may be formed to have a semicircular cross-sectional shape or other cross-sectional shapes. Alternatively, the first guide sealing part may include a single first guide sealing protrusion.

In the state in which the valve member 200 is moved to the first position, the first guide sealing protrusion 442 may be in elastic contact with the lateral portion of the valve member 200, thereby sealing the gap between the valve member 200 and the first wall portion together with the common sealing protrusion 432.

As described above, in the state in which the valve member 200 is seated on the first seating part 130, the gap between the valve member 200 and the first seating part 130 may be sealed by the triple sealing structure made by the first sealing part 410, the common sealing part 430, and the first guide sealing part 440, and as a result, it is possible to obtain an advantageous effect of further improving the sealing performance of the valve member 200 and more effectively preventing a leakage of air through the gap between the valve member 200 and the first seating part 130.

The second guide sealing part 450 may have various structures capable of sealing the gap between the lateral portion of the valve member 200 and the second seating part 140, and the present disclosure is not restricted or limited by the structure of the second guide sealing part 450.

For example, the second guide sealing part 450 may include a plurality of second guide sealing protrusions 452 that may come into elastic contact with the lateral portion of the valve member 200.

The second guide sealing protrusion 452 may be configured as an elastic body made of a material such as rubber, silicone, or urethane and capable of being elastically compressed, and the material and the physical property of the second guide sealing protrusion 452 may be variously changed depending on required conditions and design specifications.

According to one form of the present disclosure, each of the plurality of second guide sealing protrusions 452 may protrude from an inner surface of the second wall portion so as to have a triangular cross-sectional shape.

According to another form of the present disclosure, the second guide sealing protrusion may be formed to have a semicircular cross-sectional shape or other cross-sectional shapes. Alternatively, the second guide sealing part may include a single second guide sealing protrusion.

In the state in which the valve member 200 is moved to the second position, the second guide sealing protrusion 452 may be in elastic contact with the lateral portion of the valve member 200, thereby sealing the gap between the valve member 200 and the second wall portion together with the common sealing protrusion 432.

As described above, according to one form of the present disclosure, in the state in which the valve member 200 is seated on the second seating part 140, the gap between the valve member 200 and the second seating part 140 may be sealed by the triple sealing structure made by the second sealing part 420, the common sealing part 430, and the second guide sealing part 450, and as a result, it is possible to obtain an advantageous effect of further improving the sealing performance of the valve member 200 and more effectively preventing a leakage of air through the gap between the valve member 200 and the second seating part 140, The arrangement structure between the common sealing protrusion 432 and the first guide sealing protrusion 442 (or the second guide sealing protrusion) may be variously changed depending on required conditions and design specifications.

According to one form of the present disclosure, the common sealing protrusions 432 and the first guide sealing protrusions 442 may come into close contact with one another so as to be alternately disposed in a movement direction of the valve member 200 in the state in which the valve member 200 is moved to the first position, and the common sealing protrusions 432 and the second guide sealing protrusions 452 may be alternately disposed in the movement direction of the valve member 200 in the state in which the valve member 200 is moved to the second position.

In particular, a first receiving portion 441 corresponding to the common sealing protrusions 432 is defined between the adjacent first guide sealing protrusions 442, and a second receiving portion 451 corresponding to the common sealing protrusions 432 is defined between the adjacent second guide sealing protrusions 452. At the first position, the common sealing protrusions 432 are received in the first receiving portion 441. At the second position, the common sealing protrusions 432 are received in the second receiving portion 451.

In the state in which the common sealing protrusions 432 are received in the first receiving portion 441 (or the second receiving portion), the common sealing protrusions 432 and the first guide sealing protrusions 442 (or the second guide sealing protrusions) may implement a structure in which typical gears engage with one another.

As described above, the common sealing protrusions 432 and the first guide sealing protrusions 442 (or the second guide sealing protrusions) are alternately in close contact with one another, and as a result, it is possible to obtain an advantageous effect of further improving the sealing performance of the common sealing part 430 and the first guide sealing part 440 (or the second guide sealing part).

In the form of the present disclosure described and illustrated above, the example in which the power converting part 320 includes the first gear 322 and the second gear 324 has been described. However, according to another form of the present disclosure, the power converting part may be implemented to have a crank mechanism.

Figure 8:
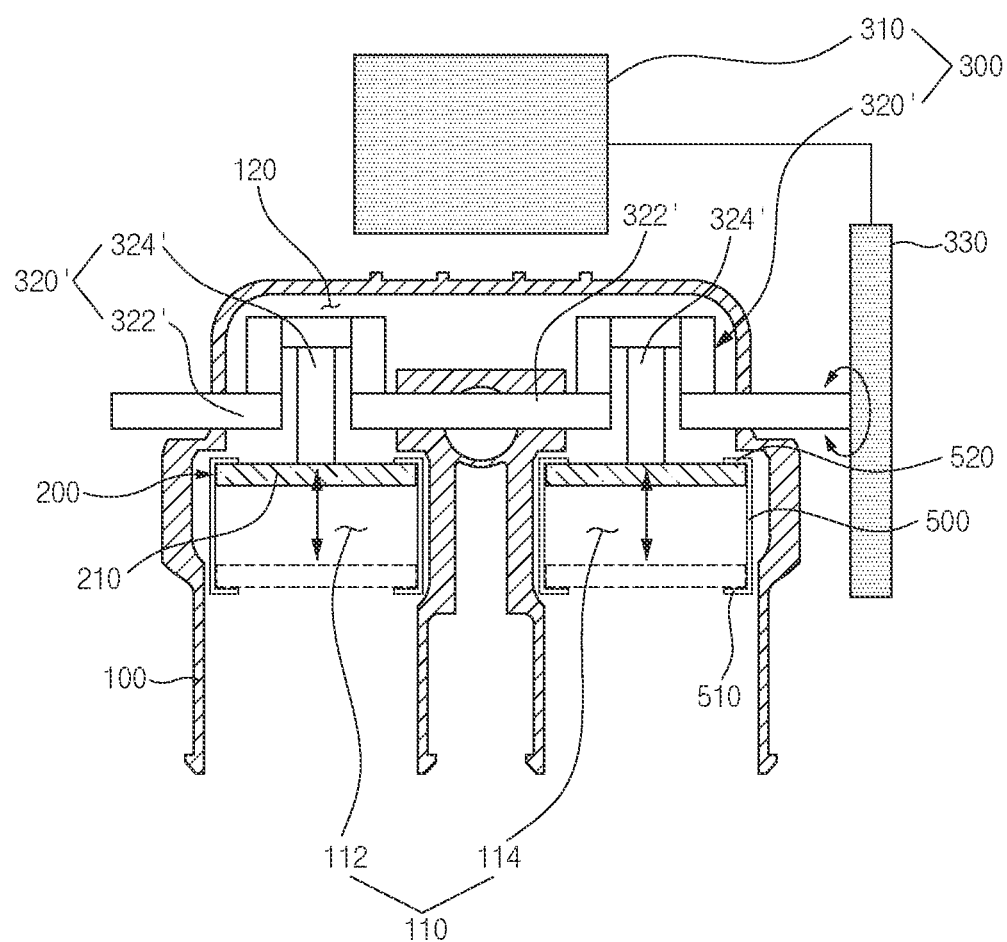
FIGS. 8 and 9 are views for explaining another example of the drive unit of the air control valve for a fuel cell vehicle according to some forms of the present disclosure.
Figure 9:
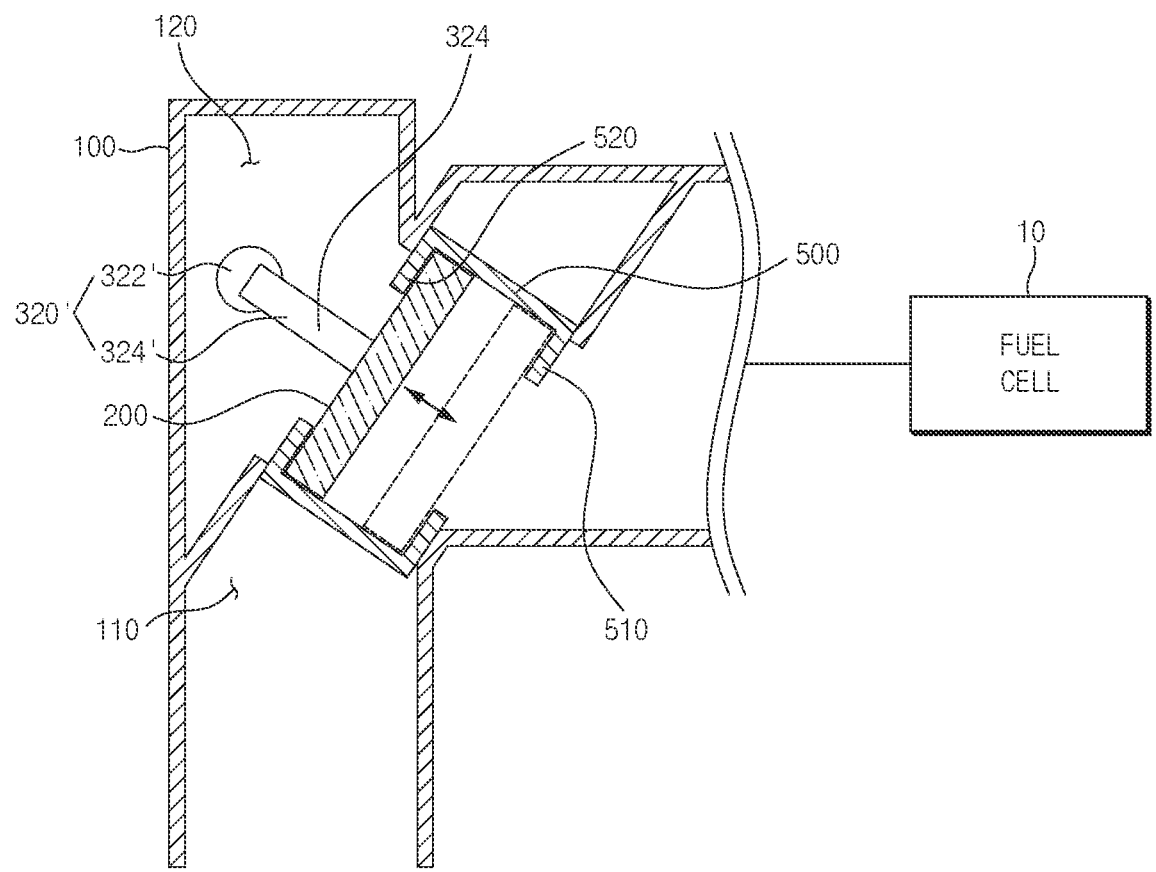

That is, referring to FIGS. 8 and 9, according to another form of the present disclosure, a power converting part 320' may include a rotating shaft 322' configured to be rotated by the driving source 310, and a reciprocating member 324' connected to the valve member 200 and configured to move the valve member 200 by being rectilinearly reciprocated by a rotation of the rotating shaft 322'.

For example, a typical crank shaft may be used as the rotating shaft 322', and a typical connecting rod may be used as the reciprocating member 324'.

As the rotating shaft 322' is rotated by the driving source 310, the reciprocating member 324' may rectilinearly move in a direction orthogonal to an axis of the rotating shaft 322', and the valve member 200 connected to the reciprocating member 324' may rectilinearly move together with the reciprocating member 324', thereby opening or closing the air flow path 110.

Referring to FIGS. 8 and 9, according to another form of the present disclosure, the air control valve 20 for a fuel cell vehicle may include guide members 500 provided in the valve housing 100 and configured to guide the rectilinear movements of the valve members 200 relative to the valve housing 100.

The guide member 500 may have various structures capable of guiding the rectilinear movement of the valve member 200 relative to the valve housing 100, and the present disclosure is not restricted or limited by the structure of the guide member 500.

For example, the valve member 200 is received in the guide member 500 so as to be rectilinearly movable. A first close contact portion 510 may be provided at one end of the guide member 500 and configured to come into close contact with one surface of the valve member 200 at the first position. A second close contact portion 520 may be provided at the other end of the guide member 500 and configured to come into close contact with the other surface of the valve member 200 at the second position.

As described above, in the exemplary forms of the present disclosure, since the valve member 200 rectilinearly moves along the inside of the guide member 500, it is possible to obtain an advantageous effect of minimizing or reducing vibration and withdrawal of the valve member 200 and more stably providing the rectilinear movement of the valve member 200 while the valve member 200 rectilinearly moves.

Figure 10:
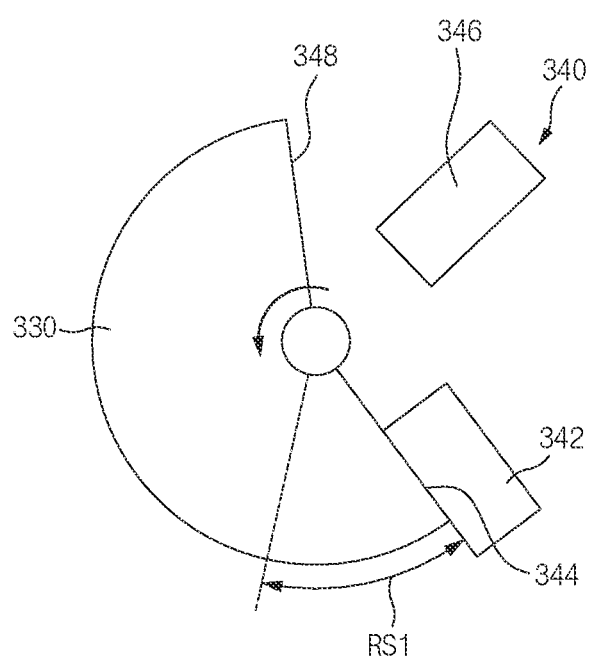
FIGS. 10 and 11 are views for explaining a stopper of the air control valve for a fuel cell vehicle according to some forms of the present disclosure.
Figure 11:
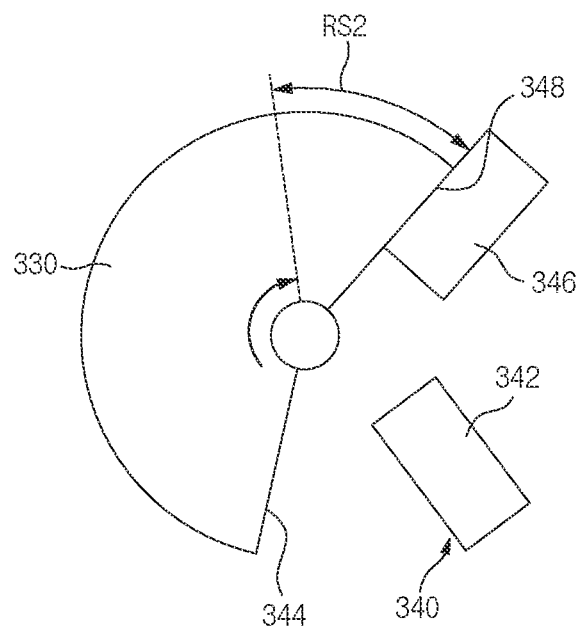

Referring to FIGS. 10 and 11, according to the form of the present disclosure, the air control valve 20 for a vehicle may include a stopper 340 configured to selectively restrict a rotation section of the driving gear 330.

The stopper 340 may have various structures capable of selectively restricting the rotation sections of the driving gear 330, and the present disclosure is not restricted or limited by the structure of the stopper 340.

For example, the stopper 340 may include: a first stopper protrusion 342 provided in the valve housing 100; a first stopper part 344 provided on the driving gear 330 and configured to come into contact with the first stopper protrusion 342 when the driving gear 330 rotates by a preset first rotation section RS1 in a first direction (e.g., counter-clockwise); a second stopper protrusion 346 provided in the valve housing 100 so as to be spaced apart from the first stopper protrusion 342 in a circumferential direction of the driving gear 330; and a second stopper part 348 provided on the driving gear 330 and configured to come into contact with the second stopper protrusion 346 when the driving gear 330 rotates by a preset second rotation section RS2 in a second direction (e.g., clockwise).

The first stopper part 344 and the second stopper part 348 may have various structures capable of being constrained by the first stopper protrusion 342 and the second stopper protrusion 346. For example, the first stopper part 344 and the second stopper part 348 may be formed by removing a part of the driving gear 330. In particular, the first stopper part 344 and the second stopper part 348 may be formed in a radial direction of the driving gear 330.

According to another form of the present disclosure, each of the first and second stopper parts may be configured in the form of a protrusion protruding from an outer circumferential surface of the driving gear.

For reference, an angle of the first rotation section RS1 and an angle of the second rotation section RS2 may be variously changed depending on required conditions and design specifications, and the present disclosure is not restricted or limited by the angle of the first rotation section RS1 and the angle of the second rotation section RS2.

As described above, according to one form of the present disclosure, when the driving gear 330 rotates by the preset first rotation section RS1 in the first direction, the first stopper part 344 comes into contact with the first stopper protrusion 342 and restricts the rotation of the driving gear 330, such that an excessive rotation of the driving gear 330 in the first direction may be prevented. As a result, it is possible to obtain an advantageous effect of preventing an excessive movement of the valve member 200.

Likewise, when the driving gear 330 rotates by the preset second rotation section RS2 in the second direction, the second stopper part 348 comes into contact with the second stopper protrusion 346 and restricts the rotation of the driving gear 330, such that an excessive rotation of the driving gear 330 in the second direction may be prevented. As a result, it is possible to obtain an advantageous effect of preventing an excessive movement of the valve member 200.

As described above, according to the exemplary form of the present disclosure, it is possible to obtain an advantageous effect of improving the sealing performance and preventing or inhibiting a deterioration of the fuel cell stack.

In particular, according to the exemplary forms of the present disclosure, it is possible to obtain an advantageous effect of uniformly forming and sufficiently providing, over the entire valve member, the pressing force to be applied to the valve member when the valve member closes the air flow path, and improving the sealing performance of the valve member.

In addition, according to the form of the present disclosure, it is possible to obtain an advantageous effect of improving stability and reliability.

In addition, according to the form of the present disclosure, it is possible to obtain an advantageous effect of simplifying a structure and miniaturizing a device.

While the exemplary forms have been described above, but the forms are just illustrative and not intended to limit the present disclosure. It can be appreciated by those skilled in the art that various modifications and alterations, which are not described above, may be made to the present form without departing from the intrinsic features of the present disclosure. For example, the respective constituent elements specifically described in the forms may be modified and then carried out. Further, it should be interpreted that the differences related to the modifications and alterations are included in the scope of the present disclosure.

What is claimed is:

1. An air control valve for a fuel cell vehicle, the air control valve comprising:
   a valve housing formed with air flow paths wherein the air flow paths comprise: a first flow path and a second flow path separated from the first flow path;
   valve members configured to selectively open or close the air flow paths;
   a drive unit configured to rectilinearly operate the valve members so that the valve members rectilinearly move from a first position at which the air flow paths are closed to a second position at which the air flow paths are opened, wherein the drive unit comprises: a driving source configured to provide driving power, and a power converting part connected to the valve members and configured to convert the driving power of the driving source into a rectilinear motion of the valve members; and
   a bypass flow path configured to connect the first flow path and the second flow path and allow air introduced into the first flow path to selectively flow to the second flow path,
   wherein the valve members comprise:
      a first valve disc configured to selectively open or close the first flow path by being rectilinearly moved by the drive unit; and
      a second valve disc configured to selectively open or close the second flow path by being rectilinearly moved by the drive unit, and
   wherein the power converting part comprises:
      a first gear configured to be rotated by the driving source; and
      a second gear connected to the valve members and configured to engage with the first gear and move the valve members by being rectilinearly moved by the rotation of the first gear.

2. The air control valve of claim 1, wherein the bypass flow path is closed by the valve members when the valve members move to the second position.

3. The air control valve of claim 1, wherein the power converting part is provided in the bypass flow path.

4. The air control valve of claim 1, comprising:
   a support member provided in the valve housing and configured to support a rectilinear movement of the second gear relative to the valve housing.

5. An air control valve for a fuel cell vehicle, the air control valve comprising:
   a valve housing formed with air flow paths, wherein the air flow paths comprise: a first flow path and a second flow path separated from the first flow path;
   valve members configured to selectively open or close the air flow paths;
   a drive unit configured to rectilinearly operate the valve members so that the valve members rectilinearly move from a first position at which the air flow paths are closed to a second position at which the air flow paths are opened, wherein the drive unit comprises: a driving source configured to provide driving power, and a power converting part connected to the valve members and configured to convert the driving power of the driving source into a rectilinear motion of the valve members; and
   a bypass flow path configured to connect the first flow path and the second flow path and allow air introduced into the first flow path to selectively flow to the second flow path,
   wherein the valve members comprise:
      a first valve disc configured to selectively open or close the first flow path by being rectilinearly moved by the drive unit; and
      a second valve disc configured to selectively open or close the second flow path by being rectilinearly moved by the drive unit,
   wherein the power converting part comprises:
      a rotating shaft configured to be rotated by the driving source; and
      a reciprocating member connected to the valve members and configured to move the valve members by being rectilinearly reciprocated by a rotation of the rotating shaft.

6. An air control valve for a fuel cell vehicle, the air control valve comprising:
   a valve housing formed with air flow paths, wherein the air flow paths comprise: a first flow path and a second flow path separated from the first flow path;
   valve members configured to selectively open or close the air flow paths;
   a drive unit configured to rectilinearly operate the valve members so that the valve members rectilinearly move from a first position at which the air flow paths are closed to a second position at which the air flow paths are opened, wherein the drive unit comprises: a driving source configured to provide driving power, and a power converting part connected to the valve members and configured to convert the driving power of the driving source into a rectilinear motion of the valve members; and
   a bypass flow path configured to connect the first flow path and the second flow path and allow air introduced into the first flow path to selectively flow to the second flow path; and
   a driving gear configured to be rotated by the driving source,
   wherein the valve members comprise:
      a first valve disc configured to selectively open or close the first flow path by being rectilinearly moved by the drive unit; and
      a second valve disc configured to selectively open or close the second flow path by being rectilinearly moved by the drive unit, and
   wherein the power converting part is configured to operate by the driving gear.

7. The air control valve of claim 6, comprising:
   a stopper configured to selectively restrict a rotation section of the driving gear.

8. The air control valve of claim 7, wherein the stopper comprises:
   a first stopper protrusion provided in the valve housing;
   a first stopper part provided on the driving gear and configured to come into contact with the first stopper protrusion when the driving gear rotates by a preset first rotation section in a first direction;
   a second stopper protrusion provided in the valve housing and configured to be spaced apart from the first stopper protrusion in a circumferential direction of the driving gear; and a second stopper part provided on the driving gear and configured to come into contact with the second stopper protrusion when the driving gear rotates by a preset second rotation section in a second direction.

9. The air control valve of claim 1, comprising:
a first seating part provided in the valve housing and configured to allow the valve members to be seated on the first seating part at the first position; and
a second seating part provided in the valve housing and configured to allow the valve members to be seated on the second seating part at the second position.

10. The air control valve of claim 9, comprising:
a first sealing part provided on a first surface of the valve members and configured to seal a gap between the valve members and the first seating part;
a second sealing part provided on a second surface of the valve members and configured to seal a gap between the valve members and the second seating part; and
a common sealing part provided on a lateral portion of the valve members and configured to seal a gap between the valve members and any one of the first and second seating parts based on a movement of the valve members.

11. The air control valve of claim 10, comprising:
a first guide sealing part provided on the first seating part and configured to seal the gap between the valve members and the first seating part in cooperation with the common sealing part; and
a second guide sealing part provided on the second seating part and configured to seal the gap between the valve members and the second seating part in cooperation with the common sealing part.

12. The air control valve of claim 11, wherein the common sealing part comprises a plurality of common sealing protrusions protruding from the lateral portion of the valve members,
wherein the first guide sealing part comprises a plurality of first guide sealing protrusions formed on an inner surface of the first seating part that faces the lateral portion of the valve members, and
wherein the second guide sealing part comprises a plurality of second guide sealing protrusions formed on an inner surface of the second seating part that faces the lateral portion of the valve members.

13. The air control valve of claim 12, wherein at the first position, the plurality of common sealing protrusions and the plurality of first guide sealing protrusions are alternately disposed in a movement direction of the valve members, and
wherein at the second position, the plurality of common sealing protrusions and the plurality of second guide sealing protrusions are alternately disposed in the movement direction of the valve members.

14. The air control valve of claim 13, wherein:
a first receiving portion corresponding to a first common sealing protrusion among the plurality of common sealing protrusions is defined between adjacent first guide sealing protrusions among the plurality of first guide sealing protrusions,
a second receiving portion corresponding to a second common sealing protrusion among the plurality of common sealing protrusions is defined between adjacent second guide sealing protrusions among the plurality of second guide sealing protrusions,
the first common sealing protrusion is received in the first receiving portion at the first position, and the second common sealing protrusion is received in the second receiving portion at the second position.

15. The air control valve of claim 10, wherein the common sealing part is formed along an entire periphery of the valve members.

16. The air control valve of claim 1, further comprising:
guide members provided in the valve housing and configured to guide rectilinear movements of the valve members relative to the valve housing.

17. The air control valve of claim 16, wherein:
the valve members are received in the guide members so as to be rectilinearly movable,
a first close contact portion is provided at a first end of the guide members and configured to come into close contact with a first surface of the valve members at the first position, and
a second close contact portion is provided at a second end of the guide members and configured to come into close contact with a second surface of the valve members at the second position.

* * * * *